(12) United States Patent
Trickett

(10) Patent No.: US 6,798,714 B1
(45) Date of Patent: Sep. 28, 2004

(54) METHOD OF PERFORMING STRETCH-FREE NORMAL MOVEOUT (NMO) AND STACKING OF SEISMIC TRACES

(75) Inventor: Stewart Trickett, Calgary (CA)

(73) Assignee: Kelman Technologies Inc., Calgary (CA)

( * ) Notice: Subject to any disclaimer, the term of this patent is extended or adjusted under 35 U.S.C. 154(b) by 0 days.

(21) Appl. No.: 10/425,636

(22) Filed: Apr. 30, 2003

(51) Int. Cl.[7] ............................................... G01V 1/36
(52) U.S. Cl. .............................. 367/52; 367/51; 702/17
(58) Field of Search ........................ 367/51, 52; 702/17

(56) References Cited

U.S. PATENT DOCUMENTS

| | | | | |
|---|---|---|---|---|
| 5,197,039 A | * | 3/1993 | Corcoran et al. ............. 367/52 |
| 5,671,136 A | * | 9/1997 | Willhoit, Jr. ................ 702/18 |
| 5,978,314 A | * | 11/1999 | Pham ......................... 367/52 |
| 6,021,379 A | * | 2/2000 | Duren et al. ................. 702/16 |
| 6,084,825 A | * | 7/2000 | Poggiagliolmi ............. 367/30 |

* cited by examiner

Primary Examiner—Nelson Moskowitz

(57) ABSTRACT

A method of performing normal moveout (NMO) correction and stacking of a common-midpoint (CMP) gather of seismic traces in a manner that avoids NMO stretch is disclosed. A CMP gather without NMO correction is modeled as the sum of a series of short overlapping time intervals whose center times follow the NMO curve as it changes with offset. The sample values contained in these intervals are solved simultaneously by performing a statistical fit to the CMP gather based on this model. A CMP stacked trace is formed by summing these intervals at their zero-offset positions at each time sample.

18 Claims, 9 Drawing Sheets

METHOD OF PERFORMING STRETCH-FREE NORMAL MOVEOUT (NMO) AND STACKING OF SEISMIC TRACES

FIELD OF THE INVENTION

The present invention relates to processing seismic data, and is particularly concerned with avoiding normal moveout stretch during the stages of normal moveout correction and common-midpoint stacking.

BACKGROUND OF THE INVENTION

Referring to FIG. 1 there is illustrated a known setup 10 for gathering seismic exploration data. A seismic sound source 12 is generated at or just below the earth's surface 14, or in the case of marine seismic, just below the water surface. For each such source generation, or "shot", the sound travels into the earth 16, reflects off of changes in geology (called "events" or "reflectors") 18, and travels back to the surface 20, where it is simultaneously recorded at a plurality of receivers 22. A single such recording at a receiver 22, is called a "trace" and is in the form of a regularly sampled time series measuring the particle velocity (for land data) or change in acoustic pressure (for marine data). A single shot is typically recorded at hundreds or thousands of receivers simultaneously. Many such shots are taken for a single seismic data set, sometimes resulting in hundreds of millions of seismic traces.

Seismic data can be used to interpret, or infer, geology, and thus is useful for the location, identification, and exploitation of petroleum and minerals. Before it can be used for this purpose, however, seismic data must undergo a series of statistical processes, a task generally referred to as "seismic processing".

There are a number of effects that can confound the ability to interpret seismic data. One such effect is noise, defined generally as any unwanted recorded energy. The origins of noise can be both natural and man-made, much of the noise being caused by the shot itself.

A second confounding effect is multiples, which is energy that has reflected more than once in its propagation from shot to receiver. A typical multiple propagation path is illustrated in FIG. 2. Seismic energy travels from the shot 12 down 24 to a reflector 26, back up 28 to the surface 14, back down 32 to a second reflector 18, and then back up 34 a receiver 36 where it is recorded.

The desired energy for seismic exploration is singly reflected, that is energy that has reflected from only one geological reflector. Events that have reflected only once before being recorded, are referred to as "primaries".

One step in seismic processing is normal-move-out (NMO) correction. Traces with different "offsets" (the horizontal distance between shot and receiver) have the same reflection (or event) appearing at different times. NMO correction is a time-variant shifting of sample values so that each trace's reflections are aligned to occur at the same time, that is, as if the trace had zero offset. The NMO correction allows for stacking of traces with different offsets.

The principal parameter involved in applying NMO correction is a stacking velocity, which is a single value, varying in both time and space, controlling the amount of time shift. Choosing these stacking velocities is a routine part of seismic processing that occurs for virtually every data set.

For a given zero-offset time within a single common midpoint (CMP) gather, a traditional NMO correction shift follows a hyperbolic curve as a function of offset. In recent years more complicated formulas have been introduced that compensate for near-surface effects (Link, et al, 1992), anisotropy (change in velocity with propagation direction), and vertical velocity gradient. To correct for these last two effects, the seismic processor must pick a NMO correction parameter η (Alkhalifah, 1998) in addition to a stacking velocity.

Another step in seismic processing is front-end muting, which is the setting to zero of sample values near the beginning of the trace. The purpose of front-end muting is to remove noise and other unwanted effects from the front of the trace.

Another step in seismic processing is common-midpoint (CMP) stacking, where traces, having roughly the same midpoints between their shot and receiver positions, are collected into groups. At each recorded time sample, the non-muted values for every trace in the group are averaged together, producing a single "stacked" trace for each group. One benefit of CMP stacking is noise reduction due to the averaging of many values into one value. A second benefit is multiple reduction, resulting from the fact that while NMO correction lines up primary reflections, it does not line up multiple reflections, so that multiples tend to attenuate during averaging.

The multiple-reducing property of stacking depends critically on there being a broad range of offsets within the non-muted sample values. Another-benefit of stacking is reducing the amount of data, typically by a factor between 10 and 100, so that the data can be displayed in a manner that is convenient and easy to interpret, specifically as a "stacked CMP section". Yet another benefit of stacking is reduction of the computation time required for later processes such as migration and noise reduction.

The typical processing steps of seismic processing are illustrated in FIG. 3. We begin with a CMP gather of traces 42. A NMO correction is applied 44, and then front-end muting 46. Finally the traces are stacked into a single stacked trace 48.

NMO correction causes distortion of seismic events in time (Dunk and Levin, 1973), the principal effect being stretch, which is the conversion of high frequencies into low frequencies by expanding the time base. It is a well known principle in seismic processing that to be as interpretable as possible, seismic events should be as broad band in frequency as the noise allows (Berkhout, 1984). Thus NMO stretch can mean a loss in the ability to infer geology. NMO stretch is particularly severe at early times, large offsets, and fast vertical changes in velocity. Referring to FIG. 4, there is illustrated an artificial CMP gather 50. After NMO correction 52 the gather has stretch 54 at far offsets and early times. After stacking the gather 56, there is distortion of early events 58 as compared to later events 60.

NMO stretch is caused by the implicit assumption that seismic events occur instantaneously. However, this is not the case. A seismic event typically has an effective length between 20 to 60 ms in duration. As a result, during standard NMO correction, a different time shift is applied to the beginning of an event than to the end.

A well known way of avoiding NMO stretch is to apply a front-end mute that zeroes all trace samples suffering from too much NMO stretch. FIG. 5 illustrates a is known seismic processing sequence. The same artificial NMO-corrected gather 52 as in FIG. 4 is shown. A front-end mute is applied 64. The resulting stack 66 shows much less distortion at early times 68 as compared to later times 70.

However, there are drawbacks to this approach. First, the CMP gather has less redundancy (or "fold") at early times, resulting in decreased noise reduction in stacking. Second, the CMP gather has less far-offset information at early times, resulting in decreased multiple reduction in stacking. Third, changes in event character with offset contains valuable interpretive information referred to as amplitude-versus-offset, or AVO effects (Castagna and Backus,1993). Front-end muting results in the loss of some AVO information.

Other solutions have been suggested for mitigating NMO stretch. Rupert and Chun (1975) introduced block move sum NMO, where traces are subdivided into overlapping blocks of samples. Each block has constant-shift NMO applied, and the blocks summed with weights to form the NMO-corrected gather. A related approach was described by Shatilo and Aminzadeh (2000), where the normal moveout function is kept constant in the vicinity of discrete events. Byun and Nelan (1997) apply time-varying filters to NMO-corrected traces to reverse the loss of high frequencies.

Hicks (2001) describes a method for removing NMO stretch during stacking based on a Parabolic Radon Transform, as well as a method that removes stretch from an NMO-corrected CMP gather based on a Fourier-Radon Transform. There are a few drawbacks to these methods; first, the processor must pick an appropriate path through the transform results, or rely on an automatic picker whose robustness in the face of noise is questionable; second, they give poor results for overlapping events with different velocities; third, the methods may give poor results for subtle events which are not picked, and whose presence the processor may not even be aware of.

SUMMARY OF THE INVENTION

An object of the present invention is to provide an improvement for normal moveout correcting and stacking of seismic traces.

In accordance with an aspect of the present invention there is provided a method of correcting for normal moveout and stacking of seismic traces comprising the steps of: inputting a common midpoint gather; muting a front-end portion of each trace; defining a series of overlapping time intervals; solving for a time interval fit to gather data; positioning time intervals at their zero-offset positions; and summing time intervals at each time sample to provide a stretch-free stacked trace.

In accordance with an aspect of the present invention there is provided apparatus for correcting for normal moveout and for stacking of seismic traces comprising: means for inputting a common midpoint gather; means for muting a front-end portion of each trace; means for defining a series of overlapping time intervals; means for solving for a time interval fit to gather data; means for positioning time intervals at their zero-offset positions; and means for summing time intervals at each time sample to provide a stretch-free stacked trace.

BRIEF DESCRIPTION OF THE DRAWINGS

The present invention will be further understood from the following detailed description with reference to the drawings in which.

DETAILED DESCRIPTION OF THE PREFERRED EMBODIMENTS

Reference is to be had to FIGS. 6–9 in which identical reference numbers identify similar components.

Figure 1:
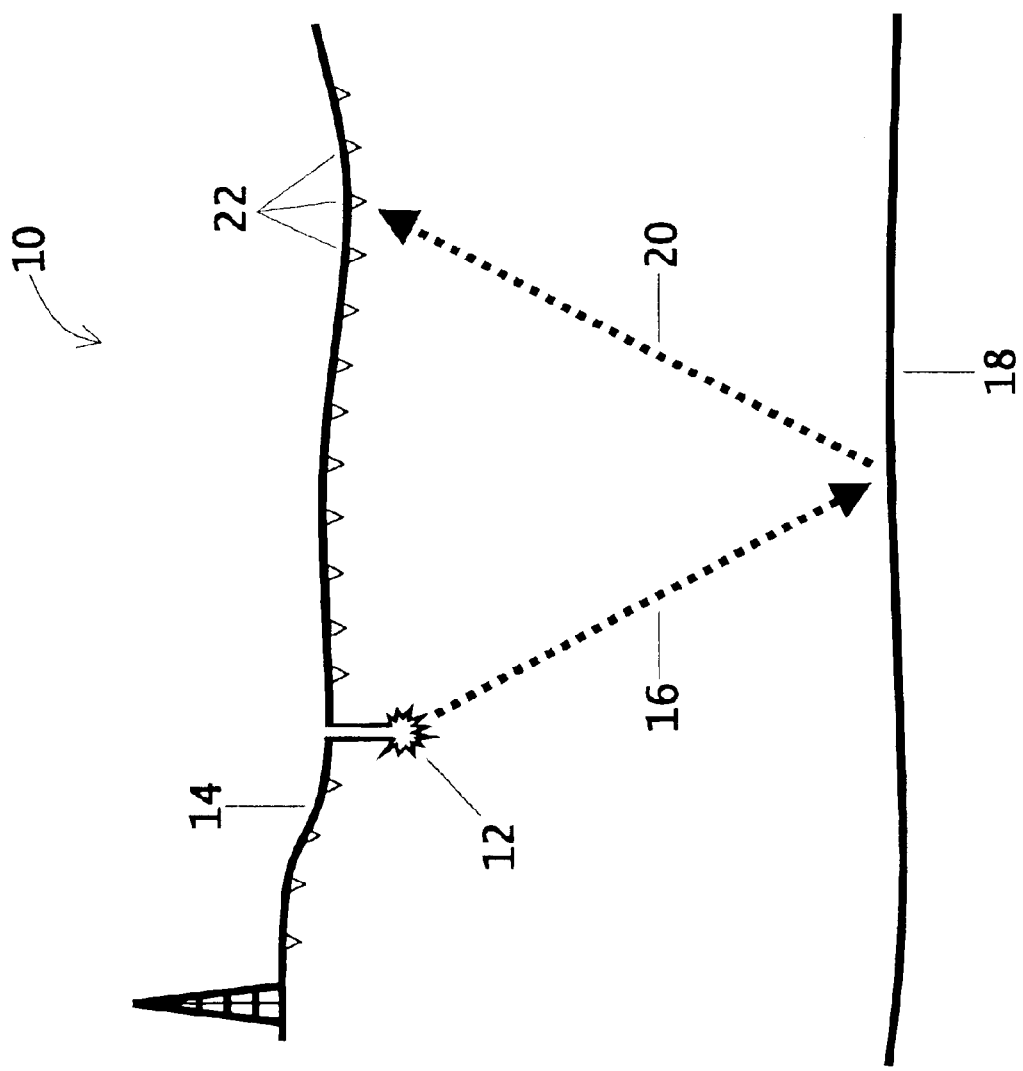
FIG. 1 illustrates a known system used in the acquisition of data from a single seismic shot.
Figure 2:
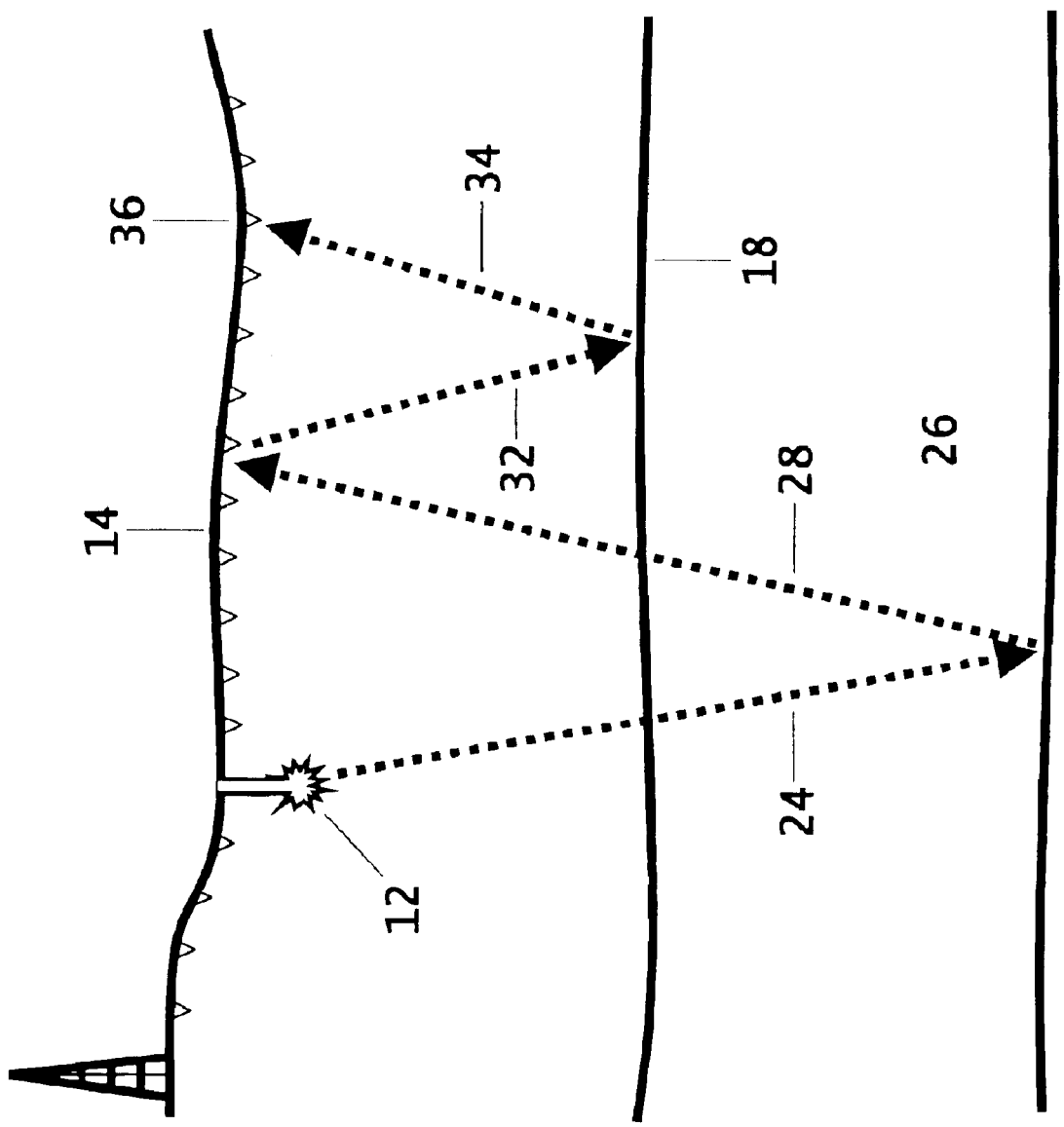
FIG. 2 illustrates a known propagation path of a typical multiple reflection for the system of FIG. 1.
Figure 3:
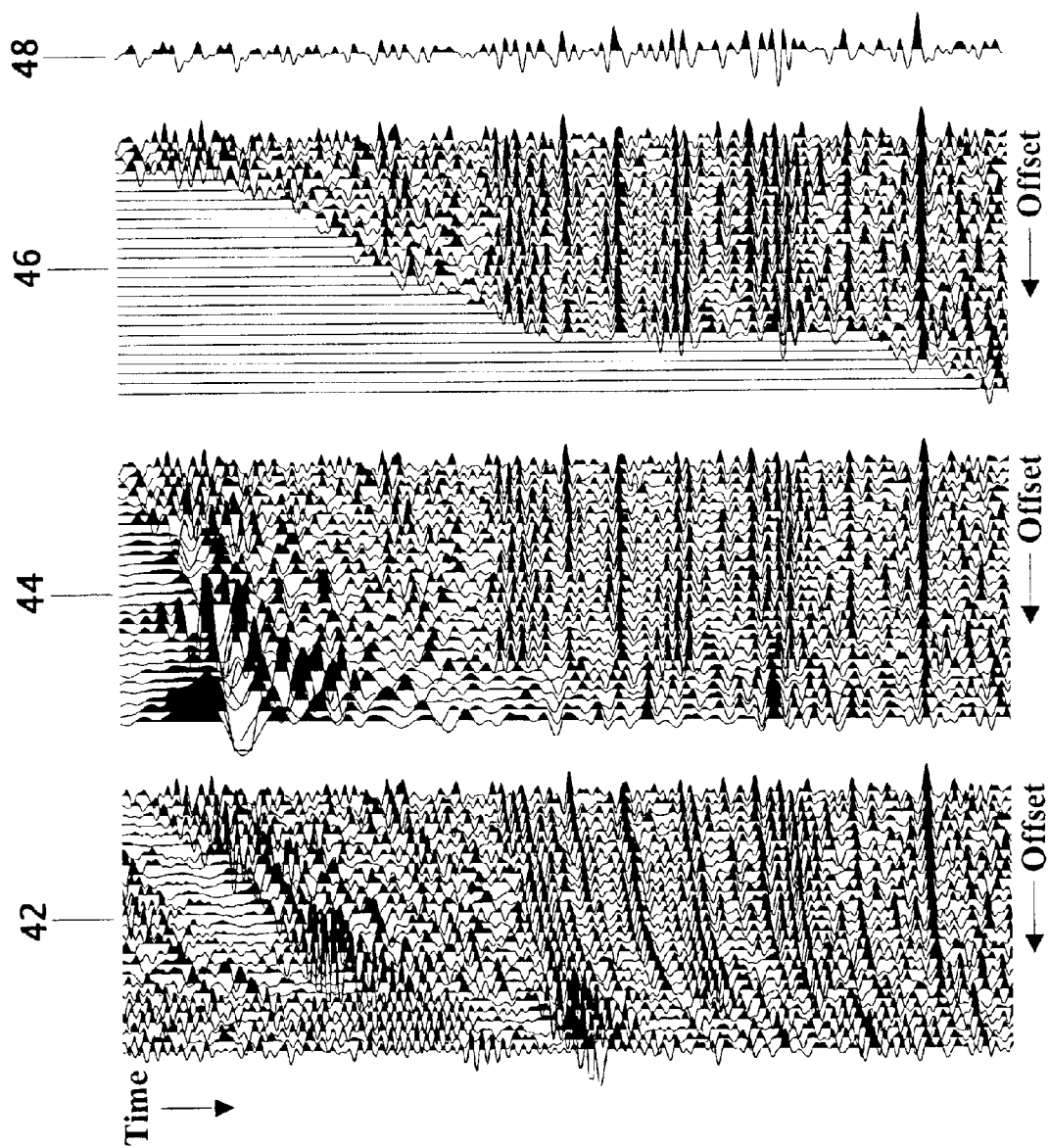
FIG. 3 illustrates of a known application of NMO correction, front-end muting, and stacking to a CMP gather of seismic traces.
Figure 4:
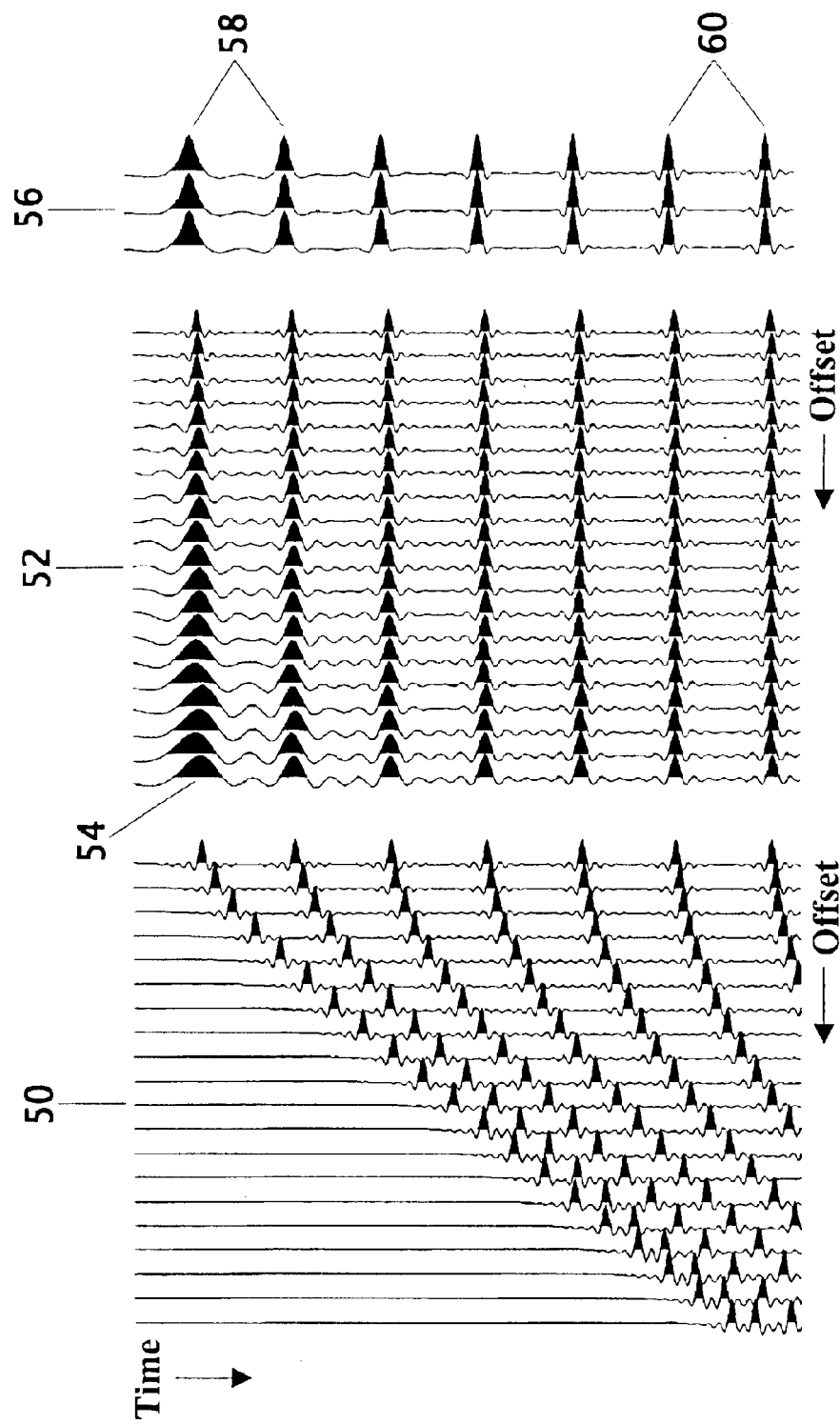
FIG. 4 illustrates known effects of NMO stretch of an artificial CMP gather of seismic traces.
Figure 5:
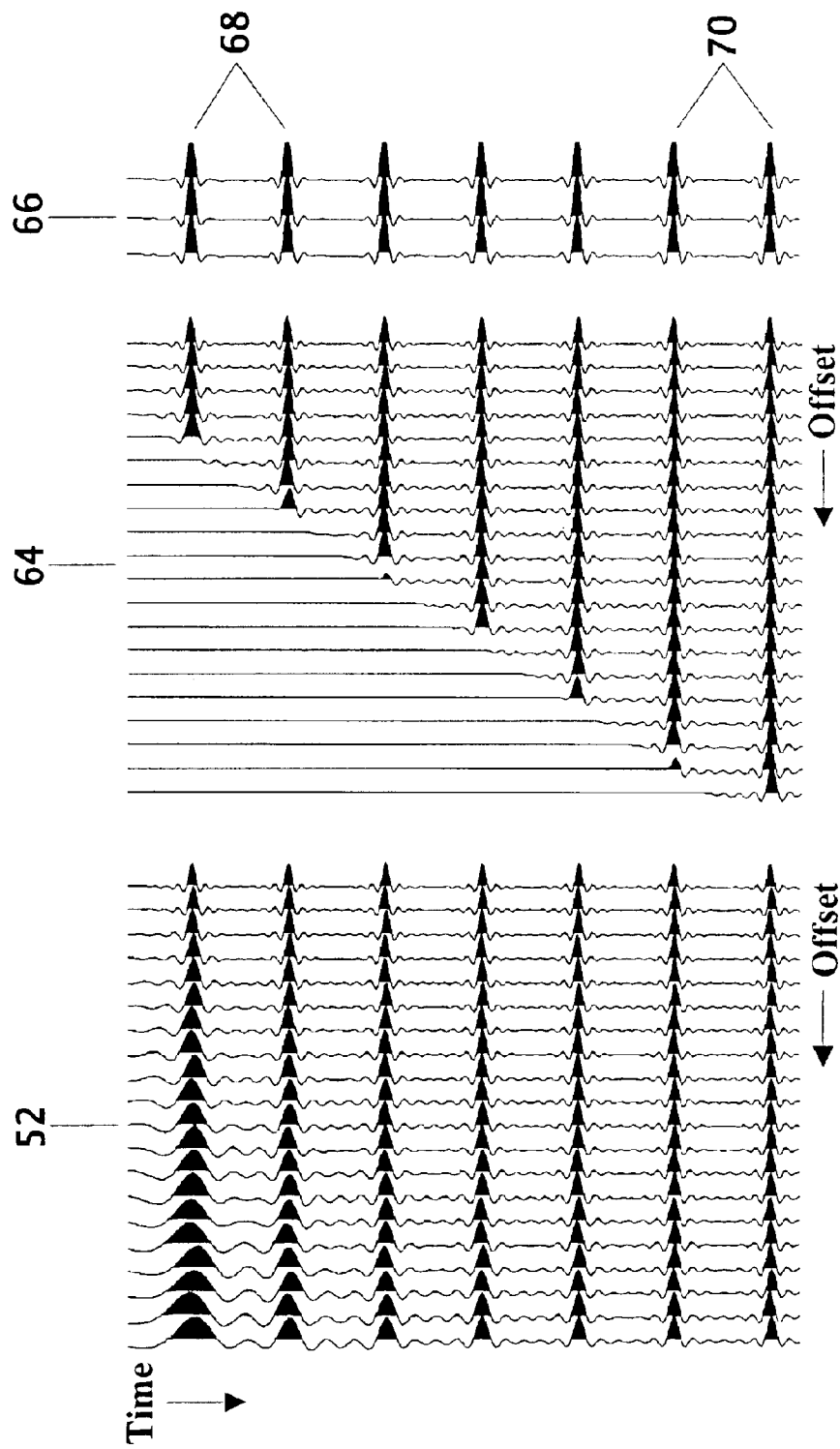
FIG. 5 illustrates of another known application of NMO correction, front-end muting, and stacking to a CMP gather of seismic traces.
Figure 6:
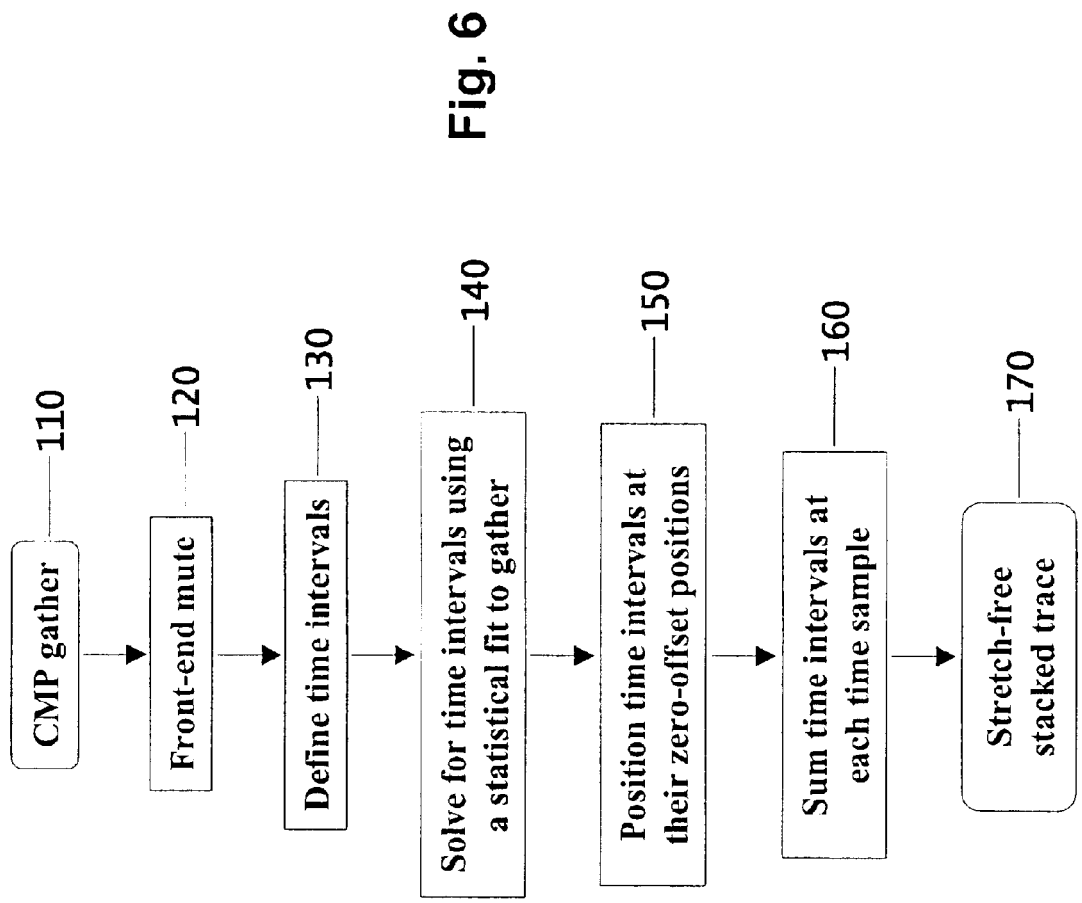
FIG. 6 illustrates in a flow chart seismic processing in accordance with one embodiment of the present invention.
Figure 7:
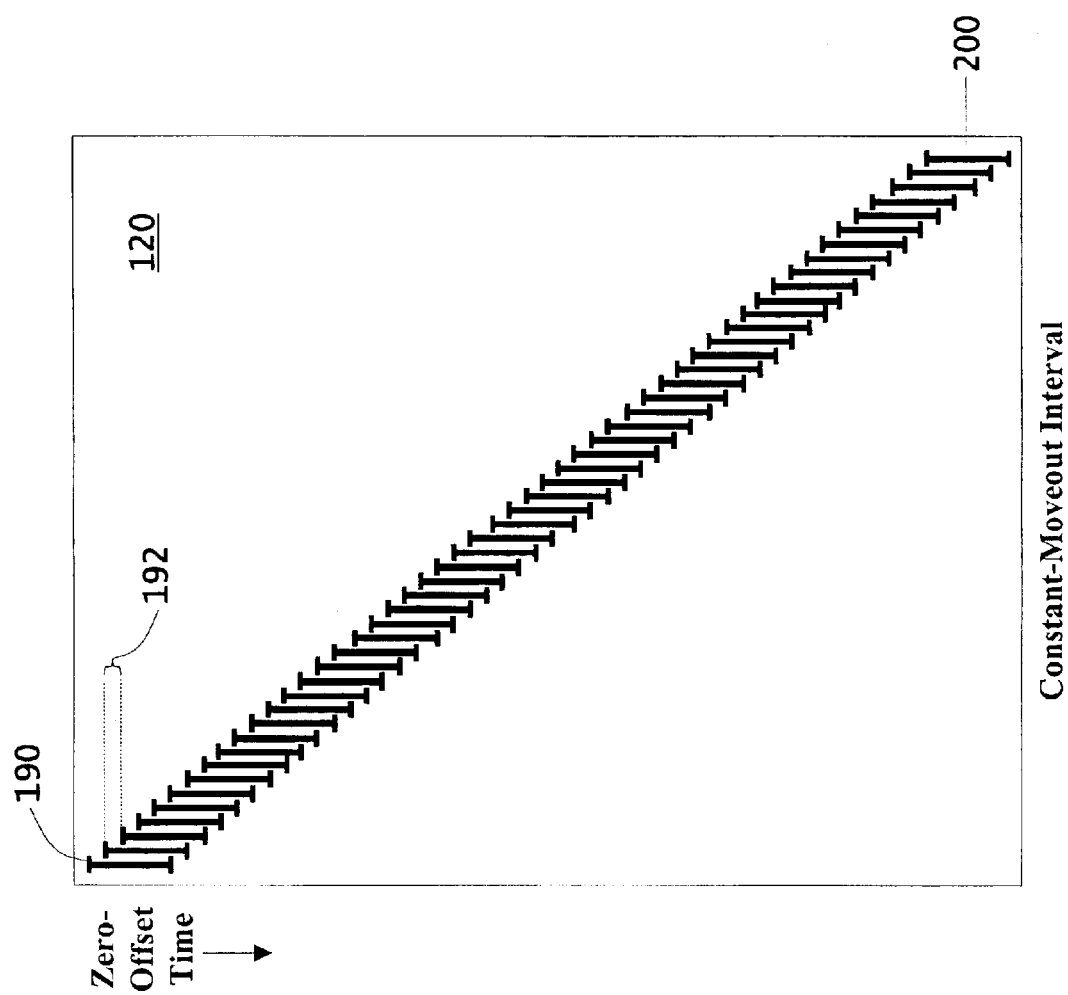
FIG. 7 graphically illustrates defining overlapping time intervals down the length of a zero-offset trace for the embodiment of FIG. 6.

Referring to FIG. 6, there is illustrated in a flow chart seismic processing in accordance with one embodiment of the present invention. The seismic processing includes inputting a CMP gather 110, a front-end mute 120, defining a time interval 130, solving for time interval fit to gather data 140, positioning time intervals at their zero-offset positions 150, summing time intervals at each time sample 160 and providing a stretch-free stacked trace 170.

The input to the embodiment of the present invention is the CMP gather 110 without NMO correction. A front-end mute 120 is selected and applied to remove strong low-velocity high-amplitude surface-related energy. This is a common and routine task for an experienced seismic processor. Avoiding excessive NMO stretch is not used as a criterion for choosing the front-end mute, resulting in a mute which is less harsh, or more open, than a mute selected for standard processing.

For a single CMP gather the step 130, we define discrete time intervals of a set length and with the same sample interval as the seismic traces. As graphically illustrated in FIG. 7 for each sample of a zero-offset trace 180 we define a new interval 190 beginning at that sample and extending down the trace the length of the interval. Thus there is a considerable time overlap amongst intervals, for example overlap 192. The last interval 200 is defined so that its end matches the end of the trace, that is, we do not define intervals whose length extends beyond the last sample of the zero-offset trace.

Figure 8:
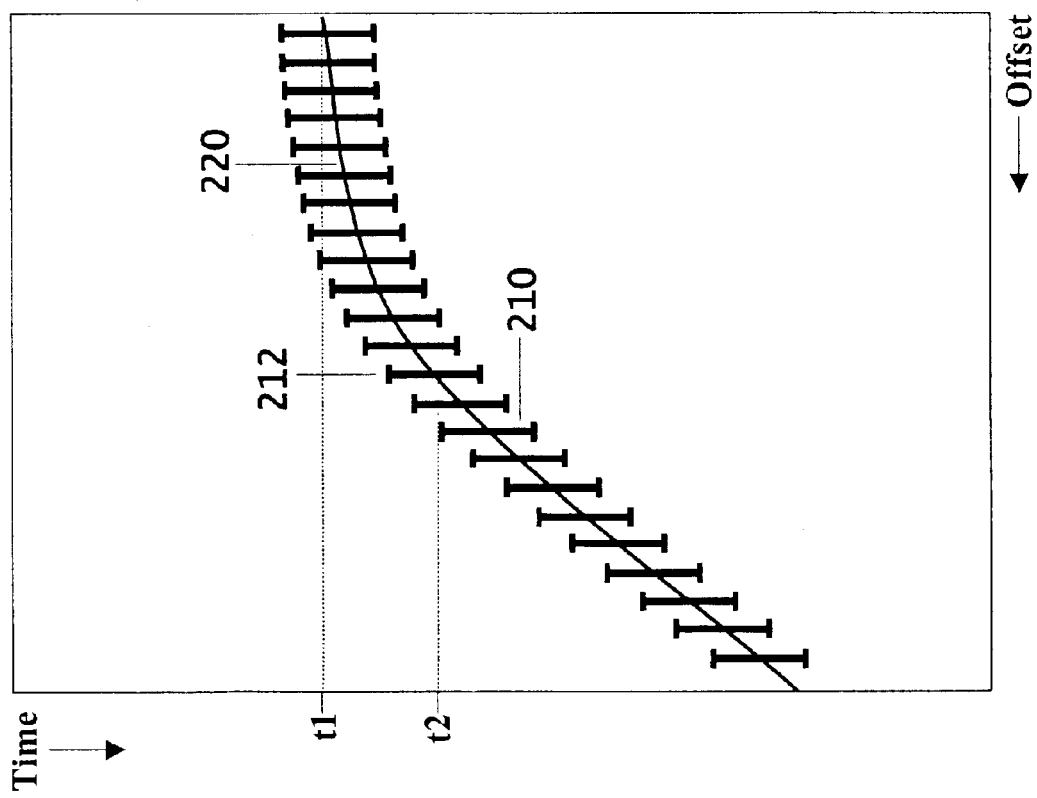
FIG. 8 graphically illustrates a single time interval as its position changes with offset for the embodiment of FIG. 6.

As illustrated in FIG. 8, for other non-zero-offset traces, the center position of a single interval 210 tracks the NMO curve 220. In other words, if the center of an interval at zero-offset is at time t1, then the center of this same interval at a non-zero-offset trace 212 is at time t2, where if NMO correction is applied to the trace then events at time t2 are shifted to time t1. The NMO curve is not restricted to being hyperbolic as a function of offset. NMO correction functions of any complexity may be used.

The interval length should approximate the effective length of the seismic wavelet. For typical seismic data a length of 24 ms works well. The CMP gather values are modeled to be the sum of the values contained in these overlapping intervals when each interval position is corrected for the trace's offset. We then solve for the interval values by performing a statistical fit 140 between the model and the CMP gather values. One such type of statistical fit is a least-squares regression, where we compute interval values, which minimize the sum (over all non-muted samples of the gather) of the squares of the differences between the model sample values and the CMP gather values. Efficient and convenient methods for computing a least-squares regression solution of large linear systems are provided by conjugate-gradient iteration (Hestenes and Stiefel, 1952) and LSQR iteration (Paige and Saunders, 1982).

Placing all intervals at their zero-offset forms the stacked trace 170. Then for each trace, sample summing together all interval values positioned at that trace sample 160. We refer to this as a "stretch-free stacked trace", and a collection of such traces as a "stretch-free stacked section".

We have described a one-sample increment between start times of the intervals at their zero-offset positions. Using an interval increment that is some multiple of a sample interval may reduce computation. For example, the seismic processor may find by testing that a two-sample increment generates a stretch-free stack that is visually identical to a one-sample-increment stretch-free stack.

For the same front-end mute, the stretch-free stack typically has a broader frequency band than the CMP stack produced by standard processing. The stretch-free stack is also typically noisier and has less multiple reduction. The extra noise can be compensated for by applying a post-stack noise reduction process such as f-x prediction filtering (Canales, 1984). The result is a stacked section, which may be easier to interpret.

Embodiments of the present invention, however, allows for a milder front-end mute than that used for standard processing, since avoiding excessive NMO stretch is not used as a criteria for selecting the mute. With a milder mute, embodiments of the present invention can produce stacked traces with less noise and less multiple contamination than are produced by standard NMO correction and stacking, resulting in a substantial improvement in interpretability.

Embodiments of the present invention have advantages over Hicks' methods. In particular, the stacking phase of the present embodiments (that is, the summing of intervals at their zero-offset positions) is simple, easily automated, and requires no picking of parameters, which is not true of Hicks' first two methods. Embodiments of the present invention are able to handle overlapping events and subtle events.

Figure 9:
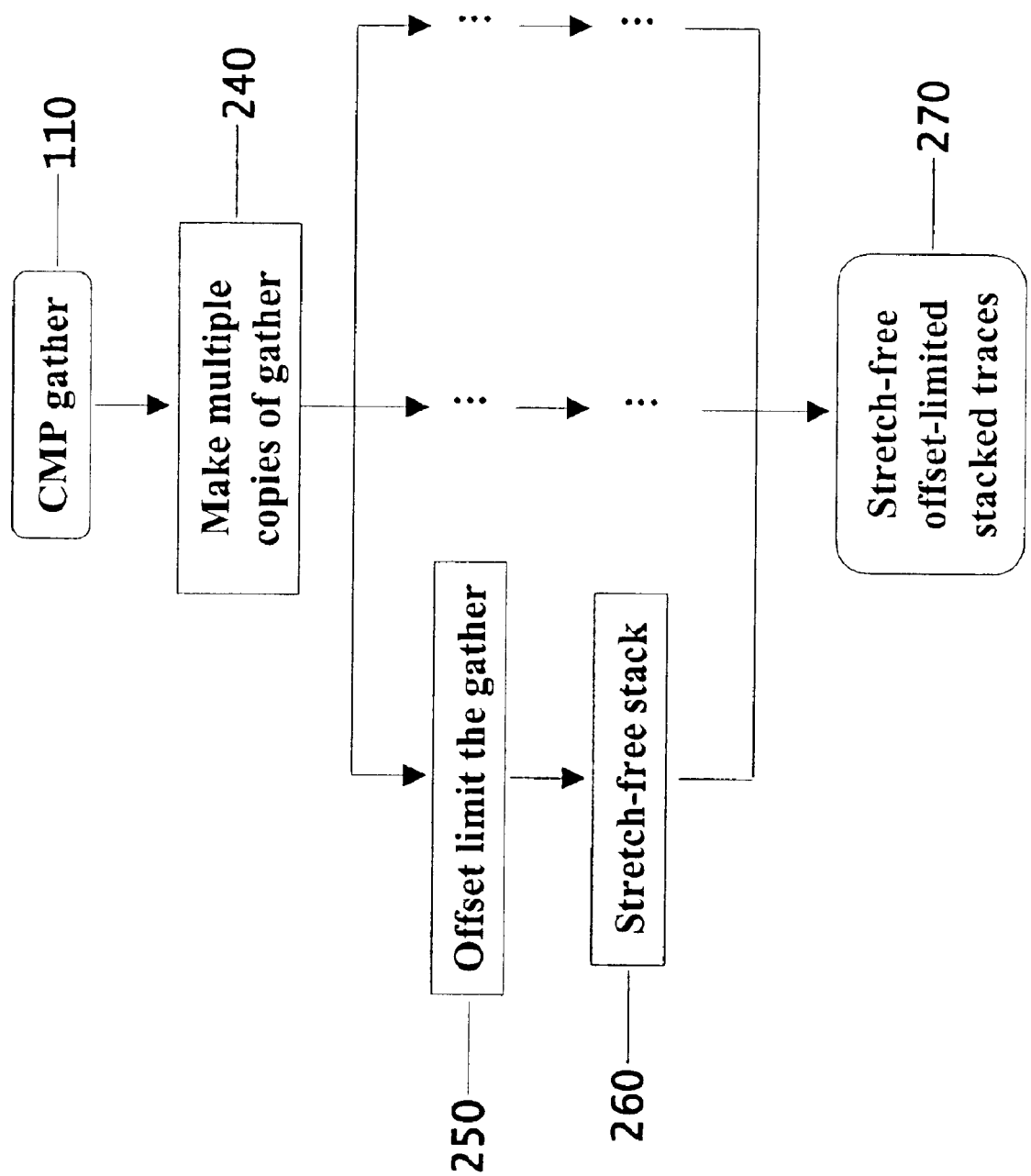
FIG. 9 illustrates a flow chart of the generation of a series of offset-limited stacks from a single CMP gather.

Because embodiments of the present invention do not produce an NMO corrected CMP gather, but rather goes directly from NMO-uncorrected gather to stacked trace, it is not as useful for AVO analysis. However, an NMO-corrected gather can be mimicked as illustrated in FIG. 9. The CMP gather 10 of FIG. 6 is copied to make multiple copies 240 of the CMP gather 230. Next removing all but those traces contained in a limited range of offsets 250 for each copy, calculating the stretch-free stack 260 for each offset-limited gather, and collecting the stacks together 270 provides off-set limited stretch free stacks. The offset ranges might be, for example, 0 to 500 m for the first copy, gather, 100 to 600 m for the second copy, and so on. Such a collection of offset-limited stacks can then be used for AVO analysis.

An additional optional step at the end of calculating the offset-limited stack. A limited-offset stack can show a loss in amplitude if there are no near-offset traces in the stack. This loss of amplitude interferes with accurate AVO analysis. It is possible to estimate and apply a correction for this loss of amplitude, and thus improve the AVO analysis:

1. For every sample of the stacked trace, find the minimum amount of NMO stretch along the NMO curve for that sample amongst all the traces forming that stack.
2. Smooth in time these minimum amounts of NMO stretch values.
3. Scale the stretch-free stack trace by these smoothed values. For example, if the smoothed minimum NMO stretch at some sample is 30%, multiply the stretch-free stack trace at the sample by 1.3.

Embodiments of the present invention may be modified to further reduce multiple reflections whose times and velocities are known beforehand. In addition to defining the usual intervals, we can add intervals, which have been picked as multiples. A statistical estimation of the interval values is done as before. During summation to stack, however, only the original primary intervals are summed. The multiple intervals are ignored, their purpose being to absorb energy that is unwanted within the stack.

The following example provides further detail of the "solve for time intervals using a statistical fit to gather" functional block 140 of FIG. 6.

Consider the value of a single sample in a single trace in the input CMP gather. According to our model, this value is the sum of zero or more values found in various intervals after these intervals have been positioned for this trace. The value of a single trace sample, then, can be written as a linear equation. If we collect the linear equations for every sample in the gather together, we can write them as a linear system of equations:

$$Ax=b$$

Where: A is a matrix representing the summation of intervals values together to form the CMP gather values, according to the defined model;

x is a vector representing all sample values held in all the intervals; and b is a vector representing the value of every sample in the CMP gather.

The goal is to determine the vector x. This linear system of equations is often over determined, meaning there are more equations than unknowns, and is usually rank deficient. As such, it is typically impossible to find a vector x which solves the system of equations perfectly. Instead we must find some vector x which approximately solves the system of equations.

One approach is to find the "least-squares solution", defined as the vector x which minimizes: $\|A x-b\|$ Where: $\|.\|$ represents the Euclidean norm of a vector—that is the square root of the sum of squares of the vector elements.

A practical and popular way to compute a least-squares solution is a conjugate-gradient iteration. This is the preferred embodiment, but other statistical fits may be best in special circumstances. For example a "least L1-norm" solution has the ability to suppress distortion due to large, erratic, noise bursts in the CMP gather sample values.

Numerous modifications, variations ad adaptation's maybe made to the particular embodiments of the present invention described above without departing from the scope of the invention as defined in the claims.

What is claimed is:

1. Method of correcting for normal moveout and stacking of seismic traces comprising the steps of:

inputting a common midpoint gather;

muting a front-end portion of each trace;

defining a series of overlapping time intervals;

solving for a time interval fit to gather data;

positioning time intervals at their zero-offset positions;

summing time intervals at each time sample to provide a stretch-free stacked trace.

2. A method as claimed in claim 1 wherein the step of muting includes removing surface related seismic energy.

3. A method as claimed in claim 1 wherein the step of defining a series of overlapping time intervals includes selecting an interval similar to an effective length of a seismic wavelet.

4. A method as claimed in claim 1 wherein the step of solving includes performing a statistical fit between model sample values and gather data values.

5. A method as claimed in claim 4 wherein the step of performing a statistical fit includes applying a least-squares regression.

6. A method as claimed in claim 1 further comprising the steps of:

copying a gather to make multiple copies;

removing all but those traces contained in a limited range of offsets;

calculating the stretch-free stack for each offset-limited gather;

collecting the stacks together to provide offset-limited stretch free stacks; and analyzing the offset-limited stretch stack for amplitude versus offset.

7. A method as claimed in claim 6 wherein the limited range of offsets are overlapping.

8. A method as claimed in claim 7 wherein the offset ranges are offset by 100 m.

9. A method as claimed in claim 8 wherein the offset ranges are 0 to 500 m for a first copy, 100 to 600 m for a second copy, and 200 to 600 m for a third copy.

10. Apparatus for correcting for normal moveout and for stacking of seismic traces comprising:

means for inputting a common midpoint gather;

means for muting a front-end portion of each trace;

means for defining a series of overlapping time intervals;

means for solving for a time interval fit to gather data;

means for positioning time intervals at their zero-offset positions; and means for summing time intervals at each time sample to provide a stretch-free stacked trace.

11. Apparatus as claimed in claim 10 wherein the means for muting includes means for removing surface related seismic energy.

12. Apparatus as claimed in claim 10 wherein the means for defining a series of overlapping time intervals includes means for selecting an interval similar to an effective length of a seismic wavelet.

13. Apparatus as claimed in claim 10 wherein the means for solving includes means for performing a statistical fit between model sample values and gather data values.

14. Apparatus as claimed in claim 13 wherein the means for performing a statistical fit includes means for applying a least-squares regression.

15. Apparatus as claimed in claim 10 further comprising:

means for copying a gather to make multiple copies;

means for removing all but those traces contained in a limited range of offsets;

means for calculating the stretch-free stack for each offset-limited gather;

means for collecting the stacks together to provide offset-limited stretch free stacks; and means for analyzing the offset limited stretch stack for amplitude versus offset.

16. Apparatus as claimed in claim 15 wherein the limited range of offsets are overlapping.

17. Apparatus as claimed in claim 16 wherein the offset ranges are offset by 100 m.

18. Apparatus as claimed in claim 17 wherein the offset ranges are 0 to 500 m for a first copy, 100 to 600 m for a second copy, and 200 to 600 m for a third copy.

* * * * *